March 31, 1970     H. FLEISSNER     3,503,134
PROCESS AND APPARATUS FOR THE TREATMENT OF MATERIALS, COMPRISING
TENSIONING AND SIEVE DRUM MEANS
Filed July 20, 1967     2 Sheets-Sheet 1
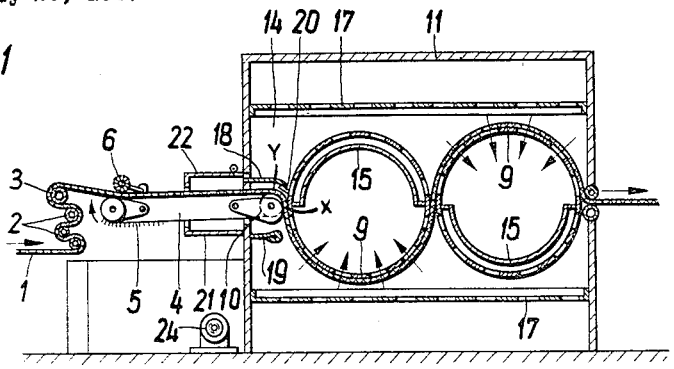
Fig.1
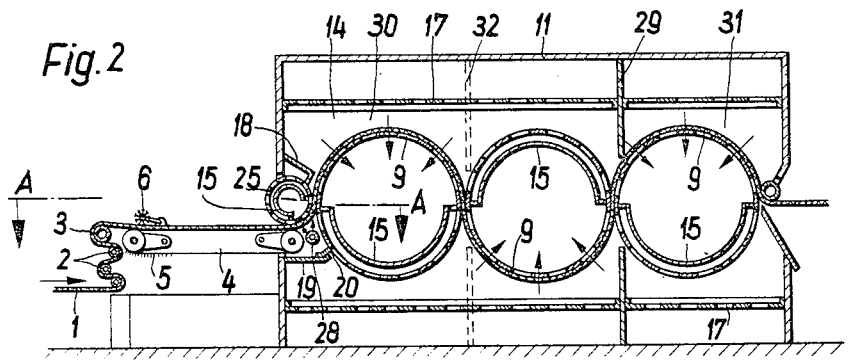
Fig.2
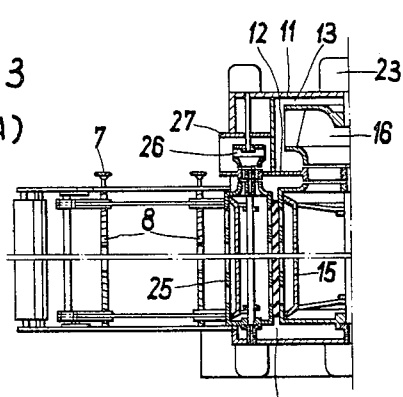
Fig.3 (A-A)
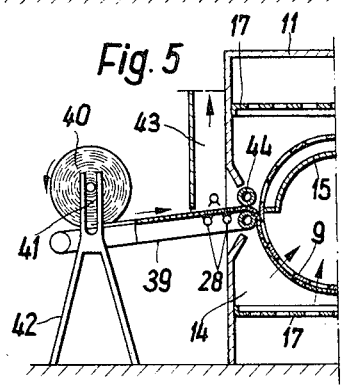
Fig.5
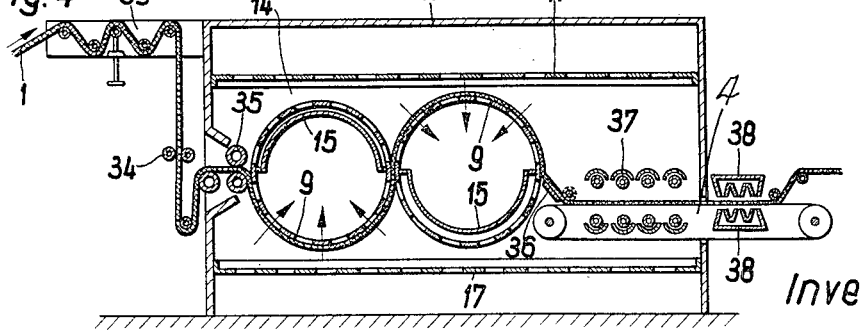
Fig.4
Inventor:
Heinz FLEISSNER
by Dick and Craig
ATTORNEYS United States Patent Office 3,503,134
Patented Mar. 31, 1970

3,503,134
PROCESS AND APPARATUS FOR THE TREATMENT OF MATERIALS, COMPRISING TENSIONING AND SIEVE DRUM MEANS
Heinz Fleissner, Egelsbach, near Frankfurt, Germany, assignor to VEPA, AG
Filed July 20, 1967, Ser. No. 654,728
Claims priority, application Germany, July 20, 1966,
V 31,539; Sept. 16, 1966, V 31,951; Oct. 3, 1966,
V 32,059; Nov. 29, 1966, V 32,447
Int. Cl. F26b 3/06, 13/30
U.S. Cl. 34—12                                22 Claims

ABSTRACT OF THE DISCLOSURE

The present disclosure relates to a process and apparatus for the treatment of materials, for example drying, steaming, setting, curing, etc., lengths of textile materials such as woven and knitted fabrics, non-woven, tufteds, and the like, with a treatment medium, for example, air, steam or air/steam mixtures. More particularly, the present disclosure is directed to a process and apparatus for the treatment of materials which comprises conveying a continuous length of material through a treatment chamber on the surface of at least one sieve means subjected to a suction draft, said material being held to said sieve means by said suction draft, and drawing a treatment medium around and through the material being treated, said material being held and guided at the inlet of the apparatus and/or at the outlet of the apparatus in a stretched condition on tensioning elements before it is introduced onto the sieve means and/or after it is removed from the sieve means.

BACKGROUND OF THE INVENTION

The present invention relates to a process and apparatus for the treatment of materials, for example, drying, steaming, setting, curing, etc., lengths of textile materials such as woven and knitted fabrics, non-wovens, tufteds, slivers, tow, loose stock, etc., with a treatment medium, for example, air, steam, or air/steam mixtures, wherein the materials being treated are conveyed on at least one sieve means subjected to a suction draft and are held to the sieve means by the suction draft during the treatment process. The sieve means which can be used in the present invention include any air-permeable conveying element.

Apparatus containing sieve drums subjected to a suction draft are well known. In these devices the material to be treated is held to the sieve drums by the suction draft only and is conveyed through the treatment chamber by the rotation of the sieve drums. The sieve drums may be arranged in one horizontal row or in one vertical row or staggered to each other in two or more rows. In these devices the sieve drums are generally only partially covered with the material being treated. Baffles in the interior of the sieve drums interrupt the suction draft at that portion of the sieve drum which is not covered with the material being treated. In many cases, especially when handling delicate textile materials, the sieve drums can be covered with a fine wire mesh which is fastened to the sieve drums. Through the application of powerful suction drafts the material being treated is forced firmly against the sieve drum and/or the wire mesh cover. Shrinkage of the material in width is thus substantially eliminated. However, in many cases a shrinkage of the material, especially in the warp direction, is desirable. With sieve drum dryers this can be achieved by driving the inlet elements, for example a pair of rollers or a conveyor belt, at a higher speed than the first sieve drum, so that the material is overfed to the first sieve drum. In this way it is possible to guide the material on the sieve drums without any tension in the warp direction and thus to allow for a full shrinkage of the material.

The surprising advantages of these sieve drum devices include the safe, tensionless, crease-free material guidance achieved even at maximum working speeds due to the fact that the material being treated rests on and is drawn to the sieve drums, and the extremely short treatment times as well as a substantially uniform treatment because the gaseous treatment medium is drawn through the material and thus flows around the fibers in the material.

In spite of these surprising advantages many commission finishers still use the tenter frame for the treatment of lengths of textile materials because with these tenter frames it is possible to maintain a certain, predetermined final width of the material. Thus it is also possible to stretch the material in width so that the final width is larger than the initial width. On the tenter frames the material is held at the edges by means of heavy pins or clip chains. As a result the material sags freely so that in the case of wet material, the material weight produces tensile stresses in addition to the shrinkage forces. However, tenter frames incorporate the disadvantage that they only work with material jetting. Thus only the two surfaces of the textile length are ventilated. For example, in the case of high-grade finishing of textile materials impregnated with a synthetic resin, the synthetic resin tends to migrate to the surfaces during drying and is deposited there resulting in a board-like material finish. Also, an unevenness between the material edges and the remainder of the textile length is frequently observed which is attributed to different temperatures near the pin or clip chains. Due to the substantial temperature differences between the treatment chamber and the outer atmosphere, the chains are subjected to a heavy wear. Furthermore, heavy soiling of the chain lengths can be often observed if the tenter frame is used for dyeing processes and for finishing with synthetic resins. Apart from the high purchase costs, the susceptibility to disturbances and the high maintenance costs are additional disadvantages of the tenter frame. Treatment devices with sieve drums subjected to a suction draft are not only substantially less expensive but also, due to their solid design, are not susceptible to trouble and thus are substantially maintenance free.

SUMMARY OF THE INVENTION

An object of the present invention is to avoid the prior art disadvantages in the treatment of materials, for example textile materials.

Another object of the present invention is to provide an improved process and apparatus for the treatment of textile materials which is very economical and substantially maintenance free.

A further object of the present invention is to provide an improved process and apparatus for the treatment of textile materials wherein a predetermined final width of the material being treated is insured.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the treatment of materials, for example textile materials, can be provided wherein the material being treated is guided and held at the inlet of the apparatus and/or at the outlet of the apparatus between tensioning elements, for example tenter chains, whereby the material is held in a stretched condition between said tenter chains until it is either fed and/or passed onto a sieve subjected to a suction draft and/or removed from the last sieve means and transferred to tenter chains maintained at substantially the treatment temperature. Using this process it is insured that the material does not change, for example shrink, while it is passed from the tenter chains to the sieve means and/or from the sieve means to the tenter chains so that the effect of the combined tenter chains/sieve means is fully maintained. A particularly effective sieve means are sieve drums subjected to a suction draft.

If the tensioning elements are arranged in front of the sieve means, for example in front of the sieve drums, it is desirable to stretch the material beyond the desired final width, preferably by an amount which is equal to or slightly greater than the width shrinkage of the material during the treatment on the sieve drums. A slight width alteration is possible by adjusting the tensile strength of the batching device disposed behind the last sieve means. However, this is only possible if the material leaves the treatment apparatus with a slightly greater width than prescribed.

In order to obtain a voluminous handle, especially with knit goods and to simultaneously effect fiber setting, it is advantageous to jet the material being treated with steam between the two chains and/or on the adjoining conveying element, for example a sieve drum, to treat the material with hot air, superheated steam or a steam-air mixture on at least one additional sieve drum in order to dry and/or set the material, and to cool it down and/or to condition it subsequently on a sieve drum. By utilizing the suction draft of the sieve drums the steam is intensively and uniformly drawn through the material and thus flows around the fibers in said material.

It is also advantageous, especially when handling a material which is to fully shrink, to pass said material in a spread condition on a conveying element, preferably a conveyor belt, and to jet it with steam, if possible from both sides, on the conveyor belt. Subsequently the material can be dried and/or set on at least one sieve drum subjected to a suction draft and then held, cooled down and/or conditioned between tenter chains. This process is particularly effective for treating materials which consist of blends of synthetic fibers and cellulose fibers since with these materials the dye stuffs for the cellulose fibers are generally fixed with steam whereas the dye stuffs for the synthetic fibers are generally fixed by means of hot air. In these cases fiber setting is effected simultaneously.

According to another embodiment of the present invention it is frequently desirable to humidify the fibers before the steaming treatment, for example by spraying liquid onto the fibers and to steam, dry and/or set them subsequently with hot air, superheated steam, or an air/steam mixture. The liquid may be a treatment medium, that is a dyeing liquor, a bleaching liquor, a synthetic resin dispersion, a finishing agent and the like.

The apparatus for carrying out the process according to the present invention comprises a tenter zone with pin chains combined with a preferably heat-insulated housing, wherein at least one sieve means subjected to a suction draft, preferably a sieve drum, serves as a conveying element, one or several fans are provided for the production of a suction draft and for circulating a treatment medium and a heating means is arranged in the circulation zone of said treatment medium. The tenter zone is at least partially arranged outside of the housing as an inlet and feeding means and/or as a discharge means. When the tenter zone is at the inlet of the apparatus it is often advantageous to screen the tenter means from the treatment medium being circulated in the housing. For various purposes, especially if the tenter zone is arranged at the discharge end of the apparatus, it is advantageous to at least partially surround it with a housing and to subject the material in the housing to a partial treatment, for example to expose it to heat.

If the tensioning elements are arranged at the inlet of the apparatus it is especially desirable to design the tensioning elements as pin chains and to deflect them vertically or substantially vertically, that is to provide them with a vertical chained guidance and to effect the pinning-up and the passage of the material to the treatment chamber within the deflection range of the pin chains. Only if the pinning-up is effected within the deflection range is it possible to remove the material from the pins within the deflection range, since within the deflection range the individual pins have a larger distance from each other than within the horizontal range.

The "deflection range" means the return zone of the chains, that is, the zone where the traveling direction of the chain is altered. Thus, in the deflection range, the chains are rerouted 180° and then returned to their original position. Of course, this sequence takes place continuously. Thus, the chains are deflected vertically and returned below that portion of the chain section which is carrying the material being treated. This is to be distinguished from tenters which use a horizontal chain rerouting system. In the present invention the returning of the chains to their original position is disposed in the same plane as the chain section which is holding the material.

The removal of the material being treated from the needles of the chains is executed within the deflection or rerouting zone of the chains. FIGURE 1 illustrates this procedure whereas in FIGURE 2 the material is already lifted off the chains by a suction roll before the chains arrive in the deflection zone.

Furthermore, in the case of each tension chain there is a plane or so-called neutral zone $y$ where the chain, when it is deflected or rerouted, is neither subjected to elongation or compression. That portion of the chains which, as seen from the deflection axis, are disposed outside of the neutral zone, are stretched in the deflection range, that is, the distance of the individual chain links or the individual needle plates from one another becomes larger in the deflection range when they are located outside of the neutral zone. Thus, a stretching of the material occurs between the individual needle plates while the material is being conveyed through this portion of the deflection range. However, when the needle plates of the chain links are disposed in the neutral zone of the deflection range, no stretching of the material takes place. If the needle plates are below the neutral zone, then compression of the material occurs in the deflection range, since here the individual needle plates come into closer contact with one another. Accordingly, in order to avoid stretching of the material, it is desired to place the needle plates in the neutral zone or deeper than the neutral zone.

However, on the usual tenter frames the pinning up is not effected in the deflection range but rather in the horizontal range. In order to render it possible to design the pinning up device and the whole inlet without any modification to the tenter frame, a roller which preferably is designed as a sieve roller and subjected to a suction draft is provided for taking the material being treated out of the pins and passing it on to the subsequent sieve element. The roller has the purpose of guiding and holding the material from the time it is taken out of the pins until it is passed on to the sieve element in the treatment chamber. It is expedient to take the material out of the tenter chains and to pass it on to the subsequent sieve element at the narrowest point between the tenter chains and the sieve element whereby the material being treated is removed from the pins by the suction draft of the sieve element and/or by stationary or rotating means.

The sieve means of the treatment apparatus and the tenter feed zone means have a common, infinitely variable drive and an infinitely variable gear between the drive and the tenter feed zone means or between the drive and the treatment apparatus in order to render it possible to pass the material being treated on to the subsequent sieve elements with any desired overfeed so that the material is free to shrink on the sieve elements to the extent of the overfeed during the treatment. If a roller for the material passage is provided between the tenter zone means and the treatment apparatus, the roller is connected with the drive of the tener feed zone means and/or driven by said tenter feed zone means. In this case the overfeed is effected between the roller and the adjacent sieve element in the treatment chamber.

It is also possible to effect material passage from the tenter chains to the sieve drum means without interconnecting an element for removing the material from the pins. In this case care is taken so that the material is removed from the pins before the tenter chains are deflected and/or in the plane in which the material is guided on the tenter chains which is substantially tangential to the adjoining sieve drum means. With this arrangement it is possible to remove the material from the tenter chains by the suction draft of the sieve drum so that the material cannot shrink. At the point of material passage the distance between the pin tips and the sieve drum jacket, designated by "X" in FIGURE 1, may be only a few millimeters, for example about one to two millimeters.

According to another feature of the present invention it is desirable to arrange the pin tips of the tensioning elements in the neutral zone of the tenter chains or underneath that neutral zone. In this manner it is possible to pin up the material within the plane range of the tenter chains and to remove it from the pins within the deflection range. With this kind of guidance of the tensioning elements the material is not elongated and the pins are not forced apart within the deflection range thus permitting the material to be removed from the pins properly.

If a tenter zone means is installed behind the treatment chamber containing at least one sieve drum subjected to a suction draft, care is to be made that the material is taken by the tenter zone means and/or by the tensioning element at substantially the same temperature as the treatment temperature. This can be achieved by heating the chamber which partially surrounds the tenter zone preferably by means of the air of the treatment chamber. However, instead of hot air or in addition to hot air it is also possible to use infrared heaters for heating the tenter zone. The arrangement of the tenter zone behind the treatment chamber is especially desirable when setting lengths of material consisting of synthetic fibers or materials which contain synthetic fibers. In order to set the material in the tenter zone and to "freeze" it with a certain final width, it is desirable to correlate to the tenter zone a blower and/or jet boxes for cooling and conditioning the material.

Especially for the treatment of knit goods, it is suggested to correlate a steaming means to the roller means which is located at the inlet of the apparatus outside of the treatment chamber and is utilized for removing the material from the tenter chains and passing it on to the subsequent sieve drum means and/or the tenter zone.

For the steaming treatment a steam-permeable conveying element, for example, a sieve belt with a steaming means, for example with steam nozzle tubes, may be correlated to the apparatus outside the treatment chamber as an inlet means. At the outlet of the treatment chamber a tenter zone may be arranged with a cooling means. With knit goods it is desirable to guide the material without any lengthwise tension before and during the entire treatment. According to the present invention this is possible if the material roll and/or the material package is disposed on the inlet element, whereby said material roll is guided in lateral, stationary parts, with guide slots which are open at the top. These stationary parts can be effectively arranged at the inlet conveying element.

For treatments which require extended treatment times, an apparatus with at least one sieve drum at the inlet and a subsequent dwell zone, preferably in the form of two or more rows of rollers over which the textile material is alternately guided can be readily provided together with a tenter zone at the discharge end of the apparatus. According to the present invention instead of a sieve drum, a sieve belt subjected to a suction draft can also be used. Furthermore a sieve belt can be used as a dwell zone wherein the material is piled up in folds.

BRIEF DESCRIPTION OF THE DRAWINGS

The present invention will become fully understood from the detailed description hereinbelow and the accompanying drawings which are given by way of illustration only and thus are not limitative of the present invention and wherein, FIGURE 1 is a longitudinal section of the apparatus of the present invention with a tenter zone at the inlet of the apparatus;

FIGURE 2 is an apparatus similar to that shown in FIGURE 1;

FIGURE 3 is a sectional view of the inlet zone of the apparatus according to FIGURE 2 taken along line A—A;

FIGURE 4 is an apparatus according to the present invention wherein the tensioning elements are connected behind said apparatus; and FIGURE 5 is a different embodiment of the inlet of the apparatus shown in FIGURE 4.

DESCRIPTION OF THE PREFERRED EMBODIMENTS

Figure 6:
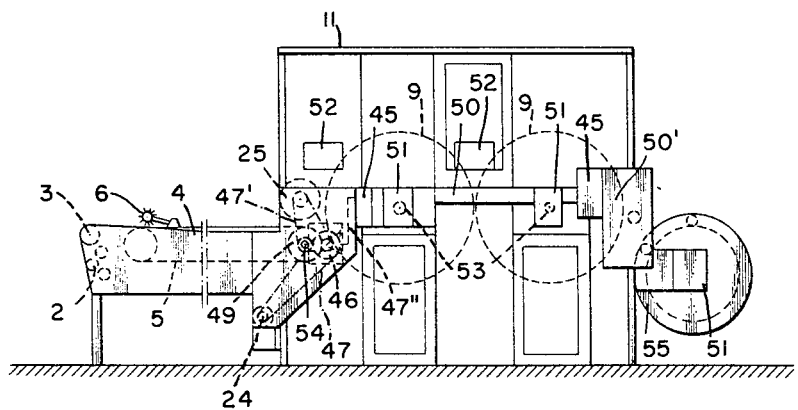
FIGURE 6 shows the infinitely variable drive means and infinitely variable gear means as defined by the present invention.

Referring now to the drawings wherein like reference numerals are used throughout the various views to designate like parts, the apparatus of the present invention comprises a system wherein the material 1 to be treated is passed on via rollers 2 which may also be designed as expander rolls and via deflector roll 3 to a tenter zone 4 containing two pin chains 5 which are adjustable in width. Brush rollers 6 serve for forcing the material 1 into the pins of the pin chains 5. The width adjustment of the pin chains 5 is effected by means of hand wheels 7 and threaded spindles 8 in the embodiment shown in FIGURE 3. However, an automatic adjustment using a servo motor (not shown) may also be provided.

In the apparatus according to FIGURE 1 the material passage to sieve drum 9 subjected to a suction draft is effected by the suction draft of the sieve drum and also by the additional cooperation of eccentrically arranged means 10. With this manner of removing the material from the pin chains, the chains must be guided in such a way that the pin tips are situated within the divided circle of the deflection. The treatment device proper has a heat-insulated housing 11 which is subdivided by means of a lengthwise partition means 12 into a fan chamber 13 and into a treatment chamber 14. In the treatment chamber sieve drums 9 subjected to a suction draft are arranged and in the fan chamber fan wheel means 16 are disposed. The suction draft is interrupted at the drum portion which is not covered with the material being treated by means of a baffle 15 which is arranged in every sieve drum 9. The air drawn out of the drums is returned at both sides, that is upwards and downwards into the treatment chamber 14. Before being returned to the treatment chamber the air can be passed around heating or cooling means (not shown) in the fan chamber. For equalizing the air, sieve sheets 17 are provided above and beneath the sieve drums 9.

In order to make sure that the pin chains 5 and the other elements of the tenter feed zone 4 remain substantially unaffected by the temperature in the treatment chamber 14 and by the treatment medium, screening means 18 and 19 extending over the whole width of the treatment chamber are provided above and beneath the tenter zone 4 extending into the treatment chamber. The screen may consist of heat-insulated parts, and at that portion of the drum which is not covered with the material being treated it may extend directly to the sieve drum 9 by means of a ceiling strip 20. Furthermore, in this embodiment the tenter zone is partially surrounded by an inlet housing 21 containing a ceiling 22 which can be tilted. A drive means 23 for the fans 16 is provided at the outside of the housing 11 whereas a drive means 24 for the tenter zone and the subsequent sieve drums is arranged underneath the tenter zone 4. The tenter means or tenter zone 4, the perforated drums 9, the feed drum 25 and the cooling drum 55 have a common drive motor 24. This drive motor 24 transmits the driving force via V-belt or chain 47 to a bevel wheel gear or gear drive unit 46. From there, the driving force is transmitted by V-belt or chain 47' to a guide wheel 49 or by drive shaft 54 of the tentering zone 4 to the feed drum 25 and by interposing V-belt or chain 47" to a variable speed gear 45. The variable speed gear 45 is connected to a worm gear 51. The worm gear 51 takes place of transmitting the driving force to the concentrically supported drive shaft 53 of the perforated drum 9. By means of universal joint shafts (not visible) disposed behind protective boxes 50, the force is transmitted once again via a worm gear 51 to the next drive shaft of a perforated drum 9. Here too, it is possible to obtain an individual speed adjustment of the perforated drum 9 by the interposition of a variable speed gear 45. From this variable speed gear 45, transmission is effected by means of spur gears and V-belts or chains, covered by protective boxes 50' to the cooling drum 55. By the interposition of the bevel wheel gear 46 and by the installation of diverse worm gears 51, the transmission of the driving force to shafts disposed at right angles to each other is accomplished. The variable speed gears make is possible, if necessary, to effect a speed graduation between the perforated drums. Of course, there are still many other possible ways of transmitting the force to all drums. The reference numeral 52 denotes observation windows which permit a visual control of the treatment process at all times.

The apparatus according to FIGURES 2 and 3 is of similar design as the apparatus according to FIGURE 1. However, with the apparatus of FIGURE 2 a suction roller 25 is provided for removing the material from the tenter chains and for passing it on to the subsequent sieve drum 9. This suction roller 25 is provided, as shown in FIGURE 3, with a separate radial fan 26 for the production of a suction draft, and the fan is arranged in a fan casing 27. The air drawn out of the suction roller 25 is blown into the workshop. For steaming processes a steam spray pipe 28 can be correlated to the suction roller 25. Further steam spray pipes (not shown) may be correlated to the tenter zone 4.

A partition means 29 which extends over the treatment chamber 14 as well as over the fan chamber 13 subdivides the apparatus into a drying and setting compartment 30 at the inlet end of the apparatus and into a cooling and conditioning compartment 31 at the discharge end of the apparatus. By means of another partition 32, shown by the dashed line, the common drying and setting compartment 30 may be subdivided into a separate drying chamber and into a setting chamber.

In the embodiment according to FIGURE 4 the tenter zone 4 is installed behind the sieve drum 9. The tenter zone is partially situated in the housing 11 so that the material has the same temperature as that on the sieve drums while being pinned up. In this apparatus, the material 1 is fed via an inlet creel 33 to a cloth guide 34 and passed on to a sieve drum 9 via a pair of rollers 35. The material can be passed on to the sieve drum with any desired overfeed by setting the speed of the pair of rollers 35 higher than that of the sieve drum. The material is then free to shrink on the sieve drum. The passage of the material 1 to the tenter zone 4 is effected by means of a chute 36. However, instead of the chute a roller may be provided. It is also possible to pin up the material with an overfeed. If a width stretching of for example 10 cc. or more is required, the length of material may be heated beyond the preceding treatment temperature by means of infrared radiators 37 or by means of hot air which flows out of jet boxes (not shown) and may be stretched in width in this condition. Outside of the housing 11, jet boxes 38 are provided for cooling down the material 1.

In the apparatus according to FIGURE 5, a steam-permeable conveyor belt 39 is provided at the inlet of the apparatus. The material 1 is presented in the form of a package 40. The package 40 rests on the conveyor belt 39 and is guided in lateral slits 41 of a support 42. Steam spray pipes 28 are arranged above and beneath the sieve belt for steaming the material. Excessive steam may be exhausted through a duct 43. At the inlet, instead of a pair of rollers, a roller 44 which loosely rests on the conveyor belt is correlated to the conveyor belt 39.

Since modifications of this invention will be apparent to those skilled in the art, it is not desired to limit the invention to the exact constitution shown and described. Accordingly, all suitable modifications and equivalents may be resorted to which fall within the scope of the appended claims.

I claim:

1. A process for the treatment of materials which comprises conveying a continuous length of material through a treatment chamber on the surface of at least one sieve means subjected to a suction draft, said material being held to said sieve means by said suction draft, and drawing a treatment medium around and through the material being treated, said material being held and guided at the inlet of the apparatus in a stretched condition on tensioning means before it is introduced onto said sieve means, said tensioning means being in such close proximity to the adjacent sieve means that the material is drawn from the tensioning means by the suction draft of said adjacent sieve means.

2. The process of claim 1, wherein the tensioning means are provided at the inlet of the apparatus and the material is stretched beyond the desired final width by an amount which is equal to or greater than the width shrinkage of the material during the treatment on the sieve means.

3. The method of claim 1, wherein the treatment process includes drying, steaming, setting and curing lengths of materials.

4. The method of claim 1, wherein the materials being treated are textile material selected from the group consisting of woven and knitted fabrics, nonwovens, and tufteds.

5. The process of claim 1, wherein the tensioning means contain pin chains and the removal of the material being treated from the pin chains of the tensioning means and passage to the next sieve conveying means is effected at the narrowest point between the pin chains and the subsequent sieve conveying means.

6. The process of claim 1, wherein the tensioning means contain pin chains and the material being treated is removed from the pin chains by the suction draft of the subsequent conveying sieve means.

7. The process of claim 1, wherein the tensioning means contain pin chains and the material being treated is removed from the pin chains by stationary or rotating means which cooperate with the subsequent conveying sieve means.

8. The process of claim 1, wherein the material being treated is jetted with steam between tenter chains of the tensioning means and/or on the adjoining sieve means, treated with hot air, superheated steam or a steam-air mixture and cooled down and conditioned on a sieve means.

9. The method of claim 8, wherein the material being treated is humidified by spraying it with a liquid before being steamed, dried and heat-set with hot air, superheated steam or a steam/air mixture.

10. The process of claim 1, wherein the tensioning means contain pin chains and the material being treated is removed from the pin chains before said chains are deflected and in the plane in which the material is guided on the pin chains.

11. The process of claim 10, wherein the plane in which the material is guided on the pin chains is arranged tangential to the adjoining sieve means.

12. An apparatus for the treatment of materials which comprises a substantially closed treatment chamber, at least one sieve conveying means subjected to a suction draft disposed within said chamber, fan means for producing a suction draft in said chamber and for circulating the treatment medium, heating means provided in the circulation zone of the treatment medium and tensioning means at least partially disposed outside of the treatment chamber as an inlet means, said tensioning means being disposed in such close proximity to the adjacent sieve means that the material is drawn from the tensioning means by the suction draft of said adjacent sieve means.

13. The apparatus of claim 12, wherein the tensioning means at the inlet of the apparatus is screened from the treatment medium being circulated in the treatment chamber.

14. The apparatus of claim 13, wherein the tensioning means is partially surrounded by an inlet housing.

15. The apparatus of claim 12, wherein the tensioning means comprise pin chains which are provided with width-adjustable threaded spindle means.

16. The apparatus of claim 15, wherein the pin chains are deflected substantially vertically and the pinning-up and removing of the material from the pin chains are effected within the deflection range of the pin chains.

17. The apparatus of claim 15, wherein a sieve roller means subjected to a suction draft is disposed between the tensioning means and the subsequent sieve means, said roller means guiding and holding the material being treated from the time the material is removed from the pin chains and passed to the sieve means in the treatment chamber.

18. The apparatus of claim 12, wherein the sieve conveying means and the tensioning means are provided with a common, infinitely variable drive means and an infinitely variable gear means to render it possible to pass the material to subsequent sieve means with any desired overfeed.

19. The apparatus of claim 17, wherein the sieve roller means is connected with the drive of the tensioning means and driven by said means.

20. The apparatus of claim 15, wherein the pin tips of the pin chains are positioned in the neutral zone of the deflection range or beneath said neutral zone.

21. The apparatus of claim 17, wherein the tensioning means is provided at the inlet of the apparatus and steaming means are associated with the sieve roller means for facilitating removal of the material being treated from the pin chains and for passing it to subsequent sieve conveying means.

22. The apparatus of claim 12, wherein the sieve conveying means are sieve drum means subjected to a suction draft.

References Cited

UNITED STATES PATENTS

| | | | |
|---|---|---|---|
| 1,492,480 | 4/1924 | Robertson | 26—60 |
| 2,343,351 | 3/1944 | Wedler. | |
| 2,473,404 | 6/1949 | Young. | |
| 3,021,607 | 2/1962 | Fleissner | 34—115 |
| 2,081,461 | 5/1937 | McCann | 26—60 |

MARK M. NEWMAN, Primary Examiner

A. D. HERRMANN, Assistant Examiner

U.S. Cl. X.R.

26—60; 34—115, 158